(12) United States Patent
Moerder

(10) Patent No.: US 6,542,493 B1
(45) Date of Patent: Apr. 1, 2003

(54) METHOD AND APPARATUS FOR A CDMA RANDOM ACCESS COMMUNICATION SYSTEM

(75) Inventor: Karl E. Moerder, Poway, CA (US)

(73) Assignee: Tachyon, Inc., San Diego, CA (US)

( * ) Notice: Subject to any disclaimer, the term of this patent is extended or adjusted under 35 U.S.C. 154(b) by 0 days.

(21) Appl. No.: 09/330,380

(22) Filed: Jun. 11, 1999

Related U.S. Application Data

(60) Provisional application No. 60/093,628, filed on Jul. 21, 1998.

(51) Int. Cl.[7] .............................................. H04B 7/216
(52) U.S. Cl. ........................ 370/342; 370/320; 375/152
(58) Field of Search ................................ 370/342, 320, 370/341; 375/152, 143

(56) References Cited

U.S. PATENT DOCUMENTS

| | | | |
|---|---|---|---|
| 5,537,397 A | | 7/1996 | Abramson |
| 5,696,762 A | * | 12/1997 | Natali et al. ................. 370/320 |
| 5,745,485 A | | 4/1998 | Abramson |
| 5,818,868 A | * | 10/1998 | Gaudenzi et al. ........... 375/152 |
| 6,108,317 A | * | 8/2000 | Jones et al. .................. 370/320 |
| 6,259,724 B1 | * | 7/2001 | Esmailzadeh ............... 375/143 |
| 6,400,695 B1 | * | 6/2002 | Chuah et al. ................ 370/310 |

FOREIGN PATENT DOCUMENTS

| | | |
|---|---|---|
| EP | 0 633 671 A2 | 1/1995 |
| WO | 98/18280 | 4/1998 |

OTHER PUBLICATIONS

Guo Q, et al. (Sep. 18, 1994) Aggressive packet reservation multiple access using signatures. IEEE International Symposium on Personal, Indoor and Mobile Radio Communications. 1247–1253.

Courtesy copy of the PCT International Search Report in 4 pages.

* cited by examiner

Primary Examiner—Thanh Cong Le
Assistant Examiner—Alan T. Gantt
(74) Attorney, Agent, or Firm—Knobbe, Martens, Olson & Bear, LLP

(57) ABSTRACT

In a system in which multiple remote units compete for limited communication resources, a remote unit accesses the system by randomly selecting a first sequence from a set of predetermined sequences. The remote unit transmits a data bit stream modulated with the first sequence beginning at one of a set of recurring admission boundaries. If the remote unit determines that the data bit stream has not been successfully received at a hub station, it randomly selects a second sequence from the set of predetermined sequences. The remote unit transmits the data bit stream modulated with the second sequence beginning at one of the set of recurring admission boundaries.

32 Claims, 6 Drawing Sheets

METHOD AND APPARATUS FOR A CDMA RANDOM ACCESS COMMUNICATION SYSTEM

This application claims the benefit of Ser. No. 60/093,628, filed Jul. 21, 1998.

BACKGROUND OF THE INVENTION

I. Field of the Invention

This invention relates generally to communication systems. More specifically, the invention relates to random access communication systems.

II. Description of the Related Art

The use of wireless communication systems for the transmission of digital data is becoming more and more pervasive. In a wireless system, the most precious resource in terms of cost and availability is typically the wireless link itself. Therefore, one major design goal in designing a communication system comprising a wireless link is to efficiently use the available capacity of the wireless link. In addition, it is also important to minimize the delay associated with data transmissions.

In a system in which multiple units compete for finite system resources, a means must be developed to regulate access to such resources. In a digital system, remote units tend to generate bursty data. The bursty data is characterized in that it has a high peak-to-average traffic ratio, meaning that large blocks of data are transferred during short periods of time interposed between significantly longer periods of idleness. Dedication of an individual communication channel to each active unit does not result in efficient use of system capacity in a system in which units generate bursty data because, during those times when the remote unit is not utilizing the system, the allocated channel remains idle. The use of dedicated channels also may impose a hard limit on the number of remote units which may simultaneously use the system regardless of the usage patterns of the remote units. In addition, the use of dedicated channels may cause unacceptable delay if the slice of capacity allocated to each remote unit is so small that data transfer rates are greatly compromised.

The characteristics of the inbound and outbound traffic tend to differ significantly in a digital data system. For example, in a system which provides wireless Internet services, a typical inbound transmission from a remote unit is relatively short, such as a request for a web page. However, a typical outbound data transfer to a remote unit tends to be rather large. For example, in response to a request for a web page, the system may transfer a significant amount of data. Because the characteristics of the inbound and outbound channel are very different, system efficiency may be increased by developing two distinct protocols for the inbound and outbound links.

A random access ALOHA protocol was developed for use in the inbound link from a remote unit in a digital data system. The basic idea behind ALOHA is quite simple: the remote units transmit whenever they have data to send. If the remote units are using a communication resource which can only be accessed by one remote unit at a time, the information from each remote unit is destroyed if two units transmit at the same time causing a collision. In a system where the remote unit can monitor the random access channel, the remote unit may listen to the channel in order to determine whether its transmission is the victim of a collision. In a system in which the remote unit does not or cannot monitor the random access channel, the remote unit may detect a collision based upon the absence of an acknowledgment received from a hub station in response to a transmission. According to standard ALOHA operation, whenever a collision occurs, the remote unit waits a random amount of time and retransmits the data. The waiting time must be random or the colliding remote units generate collisions in lockstep over and over again.

FIG. 1 is a timing diagram showing the operation of a pure ALOHA random multiple access system. As shown in shown in FIG. 1, five remote units designated A, B, C, D and E are transmitting packets of data within a common communication channel. Whenever two remote units transmit at the same time, a collision occurs and both transmissions are lost. In a pure ALOHA system, if the first bit of a new transmission overlaps just the last bit of a transmission already in progress, both transmissions are totally destroyed and both have to be retransmitted at some other time. For example, in the frequency modulated (FM) channel shown in FIG. 1 where no two packets may contemporaneously be transmitted, a packet 12 transmitted by remote unit B collides with a packet 10 transmitted by the remote unit A and a packet 14 transmitted by remote unit C. The remote unit A must retransmit the information in the packet 10, the remote unit B must retransmit the information in the packet 12 and the remote unit C must retransmit the information in the packet 14. FIG. 1 shows the remote unit C retransmitting the packet 14 as packet 14R.

In a pure ALOHA system, if the average packet transfer rate is low, most packets are transferred without a collision. As the average packet transfer rate begins to increase, the number of collisions increases and, hence, the number of retransmissions also increases. As the average packet transfer rate increases linearly, the probability of retransmissions and multiple retransmissions increases exponentially. As some point as the average packet transfer rate increases, the probability of successful transmission falls below a reasonable number and the system becomes practically inoperable. In a pure ALOHA system, the best channel utilization which can be achieved is approximately 18%. Below 18%, the system is underutilized. Above 18%, the number of collisions increases such that the throughput of the system begins to fall.

The introduction of a satellite link within a digital communication system complicates the multiple access dilemma. The use of a geosynchronous satellite typically introduces a 270 millisecond (msec) delay between transmission of a signal from a remote unit and reception of that same signal at a hub station. Due to the delay introduced by a satellite link, scheduled access schemes which require the remote unit to request system resources before beginning any transmission are impractical for many applications. Therefore, a satellite link which serves a great number of remote units which transmit bursty data is a likely environment in which to implement an ALOHA system.

If an ALOHA system is implemented in a satellite system in which the remote units can't or don't monitor the random access channel, in the event of a collision, the remote unit does not know of the collision for at least 540 msec. In addition to the notification delay, the remote unit typically must wait some random amount of time before retransmitting the data (to avoid lockstep retransmissions). The retransmitted signal is once again subjected to the 270 msec time delay. The cumulative delay of such a transmission can easily exceed one second. In a fully loaded system, the delay can be significantly longer due to the increased probability of repeated collisions. Therefore, when using a satellite link, it is advantageous to limit the number of retransmissions attributable to collisions as well as other causes. The number of retransmissions due to collisions can be decreased by simply reducing the allowable system load.

The satellite link also introduces challenges concerning the successful transmission of data over the link. Due to the high level of interference and high path loss which characterizes a satellite link, typically a relatively robust physical interface must be used. One physical interface commonly used over satellite links is direct sequence spread spectrum (DSSS). In a prior art DSSS system, the communication channel is defined by a maximal length binary spreading sequence. Each discrete binary value which makes up a spreading sequence is referred to as a "chip." The spreading sequence is selected such that the autocorrelation of the sequence with itself is nearly zero for all chip-aligned offsets other than zero. A maximal length pseudo noise (PN) sequence of length n has the property that its circular correlation with itself (autocorrelation) is either 1 or 1/n for any chip-aligned offset. The correlation of the chosen spreading sequence with itself is equal to 1/n for all chip-aligned offsets other than the zero offset. The correlation is also 1/n between the sequence and its inversion for any chip-aligned offset other than the zero offset. The correlation of the sequence and itself at zero time offset is equal to 1. Thus, as the spreading sequence length n increases, the orthogonality and, hence, isolation between the corresponding channels also increases. The means by which maximal length sequences can be identified and generated are well-known in the art.

In a typical system, each data bit generated by the remote unit is modulated with one or more chips before transmission over the wireless link. In this way, the narrow band digital data is spread across a wider transmission bandwidth. At the receiver, the received data is multiplied by the same spreading sequence which was used to create the signal in order to extract the corresponding digital data. Because the DSSS signal waveform is robust in the presence of interference, the number of retransmissions due to interference other than collisions may be decreased by incorporation of the DSSS signaling.

In a DSSS system, the remote units transmit in a common frequency band, thereby causing some level of interference to other system users. System efficiency in a DSSS system is increased if the power received at the hub station from each remote unit is controlled such that each signal arrives at the hub station receiver at approximately the same level. If a signal transmitted by a remote unit arrives at the hub station receiver at a power level that is relatively low, the signal quality may fall below an acceptable level. If, on the other hand, the remote unit signal arrives at a power level that is relatively high, the high power signal acts as unnecessary interference to other remote units. Typically, the power transmitted by the remote units is controlled by the hub station. The hub station sends power adjustment commands to the remote unit in order to equalize the power received at the hub station.

FIG. 2 is a timing diagram illustrating prior art spread spectrum ALOHA random access operation for five exemplary remote units A', B', C', D' and E' using an identical code. For purposes of illustration, the system in FIG. 2 uses a spreading code which is only seven chips ($c_1$–$c_7$) in length. In actual systems, the length of the spreading code is likely to be longer such as 255 chips in length. At time slot $t_1$ the remote unit A' begins to transmit a series of data bits each modulated with the entire seven bit spreading sequence. In systems using longer spreading sequences, it is likely that each data bit is spread with only a subset of the entire spreading sequence. At time $t_3$, the remote unit E' begins to transmit a series of data bits modulated by the same seven chip spreading code. Likewise at time $t_5$, the remote unit C' begins to transmit a series of a data bits modulated by the same seven chip spreading code.

As noted above, the spreading sequence is selected such that it is nearly orthogonal with itself at all chip-aligned offsets other than the zero offset. Therefore, under the scenario depicted by FIG. 2, the remote units A', C' and E' produce a low level of interference with one another because their respective transmissions are offset from one another. However, should two remote units begin to transmit during this same time slot (resulting in a zero offset), a collision occurs and both transmissions are lost. Because each remote unit spreads its signal with the same spreading sequence, if a collision occurs, each remote unit waits a random amount of time before beginning to transmit again in order avoid repeated collisions in lock step. Additional information concerning the use of identical spreading codes in an ALOHA CDMA communication system may be found in U.S. Pat. No. 5,537,397 entitled "SPREAD ALOHA CDMA DATA COMMUNICATIONS" issued Jul. 16, 1996.

The chip data shown in FIG. 2 is modulated with the data bits which carry the wireless link information such as the transmitted message. FIG. 3 is a timing diagram showing the impression of bit data on the system shown in FIG. 2. In FIG. 3, it is assumed that if a logical "1" is being transmitted, the spreading code is transmitting in an un-augmented form. If a logical "0" is being transmitted, the inverse of the spreading code is transmitted. The transmission of a logical "0" and the inversion of the corresponding chip data is indicated in FIG. 3 by an overbar. In FIG. 3, the remote unit A' transmits a logical "1" followed by a logical "0", the remote unit C' transmits a logical "1" followed by a logical "0", and the remote unit E' transmits two consecutive logical "0" data bits. In order to examine the effect of the bit data on the inter-channel interference, let us examine the first data bit transmitted by the remote unit C' in time slots $t_5$ through $t_{11}$. Examining the interference from the remote unit E' to the remote unit C' during time periods $t_5$ through $t_{11}$, we can conclude the interference is equal to 1/n or one seventh of the energy transmitted by the remote unit E during this period due to the DSSS properties described above. A more troublesome case is illustrated by examining the interference from the remote unit A' to the remote unit C' during the same time period. Notice that the data transmitted by the remote unit A' during the period $t_5$ through $t_{11}$ transitions from one logical value to another. The transition disrupts the spreading sequence and reduces the orthogonality between the signal from the remote unit C' and the signal from the remote unit A' during that period. For this reason, the interference from the remote unit A' to the remote unit C' during the period $t_5$ to $t_{11}$ is likely to be greater than 1/n. This phenomena is referred to as partial sequence interference and can significantly reduce the signal to interference ratio experienced by a working system. For example, in a system in which n is equal to 255 operating in a fully loaded ALOHA situation, the resulting signal to interference ratio for each transmission on average is 5.5 decibels (dB) due to the partial sequence interference which results from data transitions rather than 1/255 or approximately 24 dB. The relatively low signal to interference ratio decreases the system performance, thus, increasing the probability of retransmissions due to sources other than collisions. The incidence of retransmission due to these other sources may increase the delay introduced by the system to an intolerably high level.

Therefore, there is a need for a random access system which provides advantageous use of spectral resources as well as tolerable delay.

SUMMARY OF THE INVENTION

In a random access, direct sequence spread spectrum (DSSS) system, each time that a remote unit has a message to transmit, it randomly selects one of a set of predetermined sequences with which to modulate the available data. At the occurrence of the next admission boundary, the remote unit transmits the modulated data. If a collision occurs, the remote unit may retransmit the message using another randomly selected one of the predetermined sequences beginning at an admission boundary. By using a second randomly selected sequence, the remote unit need not delay retransmission by an arbitrary amount to avoid lock step collision with another remote unit signal. Thus, by eliminating the need to postpone retransmission attempt randomly, the average delay associated with the random access process is reduced. The use of the recurring admission boundaries allows the remote units to align their bit data boundaries, thus, resulting in a significant decrease in the inter-channel interference.

In a system in which multiple remote units compete for limited communication resources, a remote unit accesses the system by randomly selecting a first sequence from a set of predetermined sequences, and then transmitting a data bit stream modulated with the first sequence beginning at one of a set of recurring admission boundaries If the remote unit determines that the data bit stream has not been successfully received at a hub station, it randomly selects a second sequence from the set of predetermined sequences and transmits the data bit stream modulated with the second sequence beginning at one of the set of recurring admission boundaries. The remote unit may receive a message from the hub station commanding it to remove a reserved sequence from the set of predetermined sequences. In response, the remote unit refrains temporarily from transmitting using the reserved sequence for random access communications.

In one embodiment, the set of predetermined sequences comprises a maximal length sequence and a plurality of rotated versions of the maximal length sequence. In another embodiment, the recurring admission boundaries coincide with boundaries between data bits within the data bit stream. In one embodiment, the remote unit determines whether the data bit stream has been successfully received by monitoring a communication channel which carries the data bit stream modulated with the first sequence to detect a collision with another remote unit signal. In another embodiment, the remote unit determines that the data bit stream has not been successfully received by determining whether an acknowledgment of receipt of the data bit stream is received from the hub station.

In one embodiment, the remote unit randomly selects a frequency channel over which to transmit the data bit stream modulated with the second sequence. In yet another embodiment, the remote unit randomly delays transmitting the data bit stream modulated with the second sequence.

The set of predetermined sequences may be Walsh codes or Walsh codes which have been masked with a second code. The second code may determine spectral properties of the set of predetermined sequences. The set of predetermined sequences may comprise a maximal length sequence and a plurality of rotated versions of the maximal length sequence. The data bit stream modulated with the first sequence may be transmitted using a higher order modulation scheme. For example, the higher order modulation scheme may be a quadrature amplitude modulation comprising at least 16 values, or 8 or 16-ary phase shift keying.

The remote unit may receive a power control command from a hub station in order to set a power level used to transmit to within about 1 dB of accuracy. The transmission path may comprise a satellite link. The remote unit may receive a command from the hub station to use a reserved one of the set of predetermined sequences. In such a case, the remote unit transmits a data bit stream modulated with the reserved one of the set of predetermined sequences beginning at one of the set of recurring admission boundaries.

The hub station correlates one or more of the set of predetermined sequences with a set of incoming data samples beginning at one of a set of recurring admission boundaries If the hub station detects a signal level above a detection threshold corresponding to a detected one of the set of predetermined sequences, it demodulates a remote unit signal using the detected one of the set of predetermined sequences In one aspect, hub station detects a remote unit message length which exceeds a threshold. The hub station sends a message to other remote units temporarily removing the detected one from the set of predetermined sequences such that the other remote units refrain from using the detected one of the set of predetermined sequences for random access communications. The hub station may transmit an indication of the set of recurring admission boundaries to a set of remote units. In one embodiment, the hub station demodulates a series of non-contention channels which share a common frequency spectrum with the set of incoming signal samples which may consume 10% to 25% of the capacity of the common frequency spectrum and are bit aligned with the set of recurring admission boundaries. The hub station may send a power control command to the remote unit in order to set a power level at which the remote unit is transmitting to within about 1 dB of accuracy.

The hub station may monitor a plurality of random access, direct sequence spread spectrum communication channels for random access communication signals. The hub station may temporarily allocate a chosen one of the plurality of random access, direct sequence spread spectrum communication channels to a particular remote unit. The hub station may command other remote units using the plurality of random access, direct sequence spread spectrum communication channels to abstain temporarily from using the chosen one for random access communication.

A remote unit may be comprised of a process which randomly selects a first sequence from a set of predetermined sequences, a process which transmits a data bit stream modulated with the first sequence beginning at one of a set of recurring admission boundaries, a process which determines that the data bit stream has not been successfully received at a hub station, a process which randomly selects a second sequence from the set of predetermined sequences, and a process which transmits the data bit stream modulated with the second sequence beginning at one of the set of recurring admission boundaries. The remote unit may further comprise a process which randomly selects a frequency channel over which to transmit the data bit stream modulated with the first and second sequence. The remote unit may comprise a process which randomly delays transmitting the data bit stream modulated with the second sequence. In addition, the remote unit may comprise a process which receives a command from the hub station to use a reserved one of the set of predetermined sequences, and a process which transmits a data bit stream modulated with the reserved one of the set of predetermined codes beginning at one of the set of recurring admission boundaries.

BRIEF DESCRIPTION OF THE DRAWINGS

The features, objectives, and advantages of the invention will become more apparent from the detailed description set forth below when taken in conjunction with the drawings wherein like parts are identified with like reference numeral throughout and wherein.

DETAILED DESCRIPTION OF THE INVENTION

Figure 1:
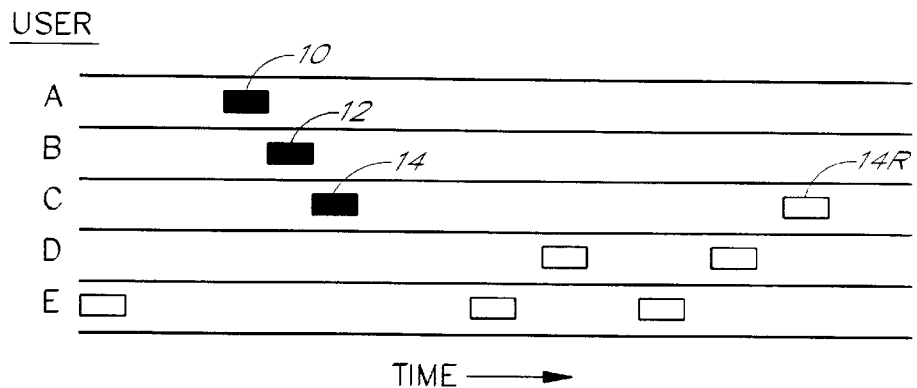
FIG. 1 is a timing diagram showing the operation of a pure ALOHA random multiple access system.
Figure 2:
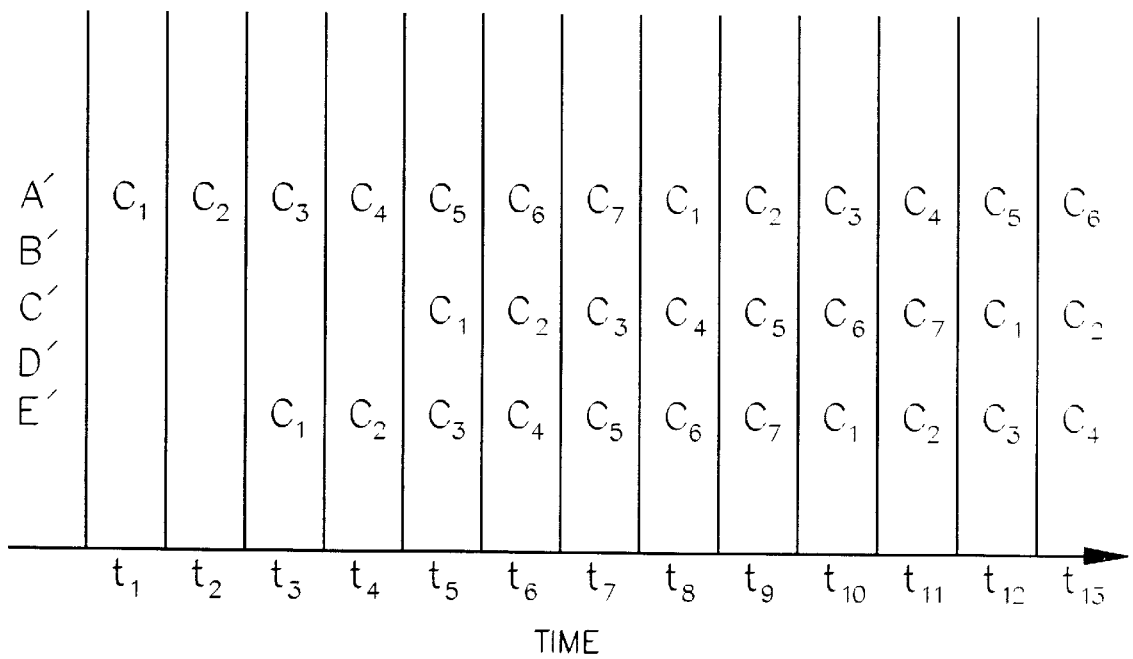
FIG. 2 is a timing diagram illustrating prior art spread spectrum ALOHA random access.
Figure 3:
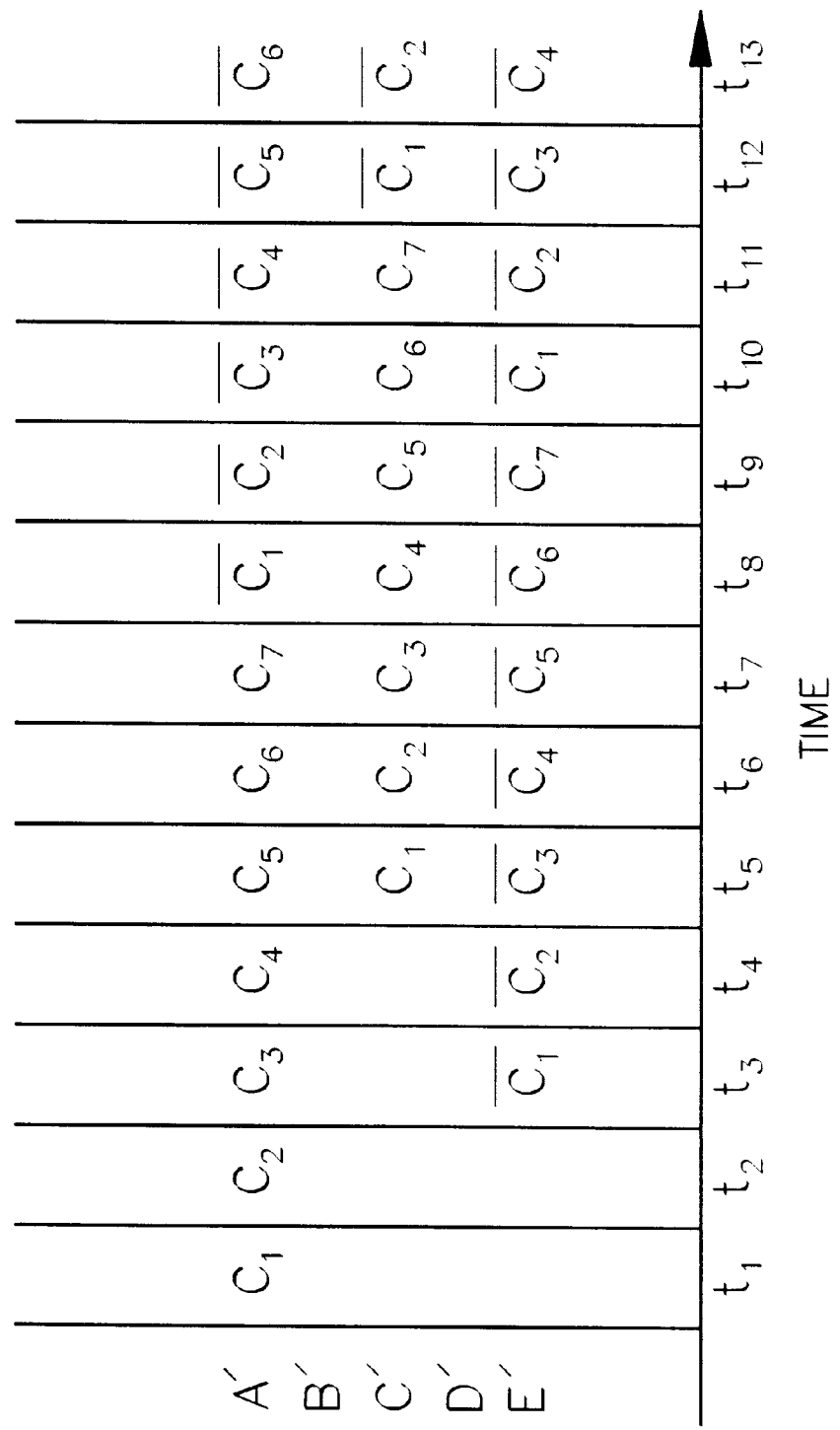
FIG. 3 is a timing diagram showing the impression of bit data on the system shown in FIG. 2.

A random access, direct sequence spread spectrum (DSSS) system according to the present invention operates based upon the use of a set of predetermined unique sequences rather than a single sequence. Each time that a remote unit has a message to transmit, it randomly selects one of the predetermined sequences with which to modulate the available data. At the occurrence of the next admission boundary, the remote unit transmits the modulated data. If a collision occurs, the remote unit may retransmit the message using another randomly selected one of the predetermined sequences upon realization of the failed transmission beginning at an admission boundary. By using a second randomly selected sequence, the remote unit need not delay retransmission by an arbitrary amount to avoid lock step collision with another remote unit signal. Thus, by eliminating the need to postpone retransmission attempts randomly, the average delay associated with the random access process is reduced. The use of the recurring admission boundaries allows the remote units to align their bit data boundaries, thus, resulting in a significant decrease in the inter-channel interference.

The admission boundaries are a set of recurring time instances at which the remote unit is allowed to begin transmission of a new message. The admission boundaries may occur as often as each data bit boundary. In order to decrease the delay associated with awaiting the occurrence of the next admission boundary, it is advantageous for the admission boundaries to occur at a relatively high rate. In this way, the delay associated with awaiting the next admission boundary is much less than the delay associated with randomly postponing transmission according to the prior art.

Beginning at each admission boundary, the hub station searches for remote unit transmissions by correlating the incoming signal samples with one or more of the set of predetermined sequences. In one embodiment, the hub station may collect the incoming signal samples and serially correlate them with the set of predetermined sequences. In another embodiment, the hub station may correlate the incoming signal samples with two or more of the predetermined sequences in parallel. The hub station can perform the correlation using any one of a variety of known techniques for receiving a signal which has a data rate which is much lower than the modulation rate. The correlation can be performed at analog baseband, digitally, at a radio frequency or intermediate frequency or using a replica of the sequence as well as using other techniques. In one embodiment, if a remote unit is currently transmitting a signal using one of the predetermined sequences, the hub station does not need to correlate the incoming signal with that sequence in order to detect a new transmission because any new transmission would result in a collision in which all data would be destroyed.

If a correlation with one of the predetermined sequences yields an energy value greater than a detection threshold, the hub station begins to demodulate that channel in order to recover the remote unit signal. If two or more remote units transmit using the same predetermined sequence at the same time, the hub station may detect the presence of the signals but it will not be able to demodulate either signal. In one embodiment, when the hub station successfully demodulates a remote unit signal, it sends an acknowledgment to the remote unit. Various means by which a hub station may correlate an incoming signal with a coding sequence are well-known in the art.

Figure 4:
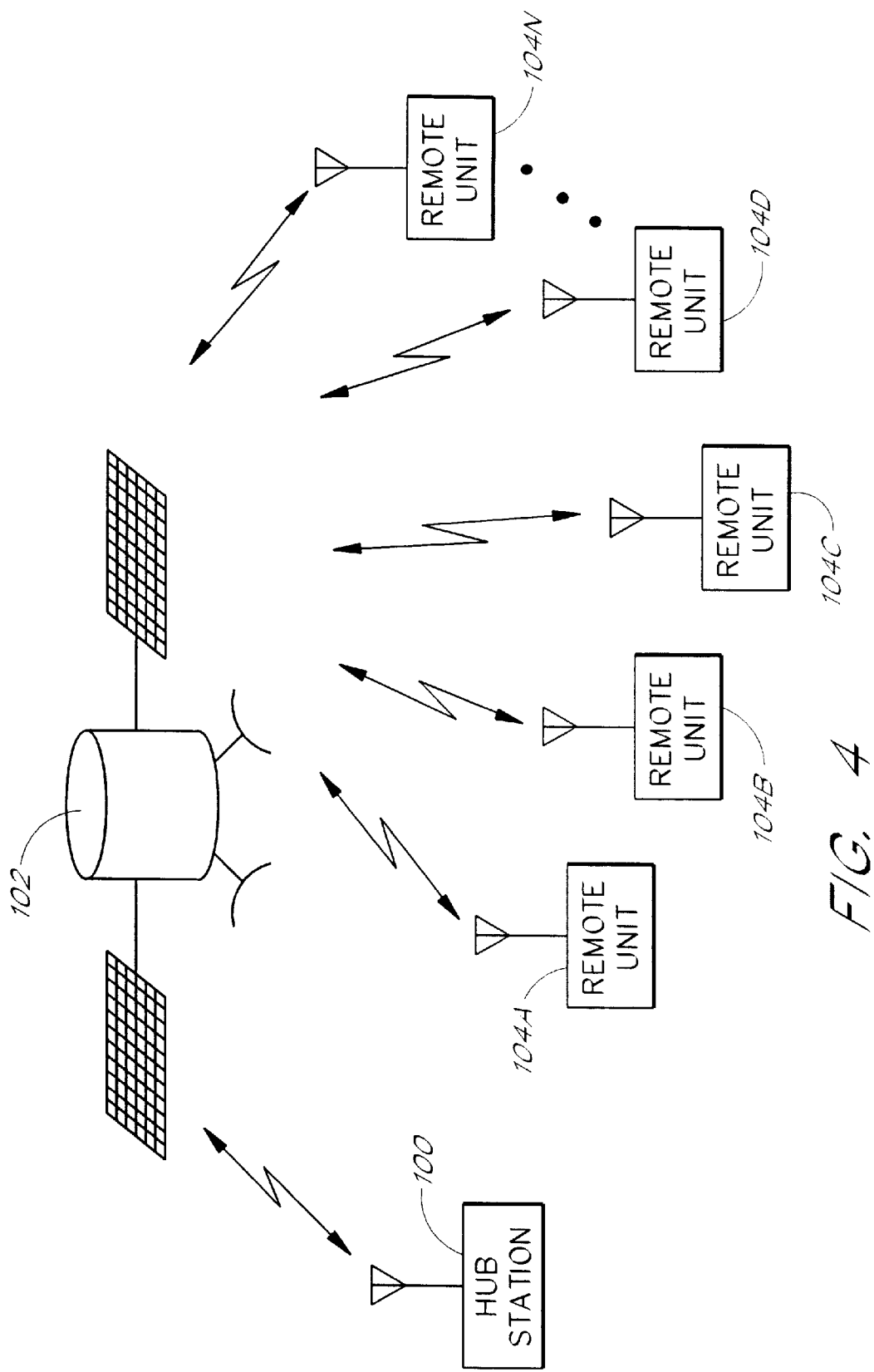
FIG. 4 is a block diagram illustrating a system according to the invention.

FIG. 4 is a block diagram illustrating a system according to the invention. In FIG. 4, a hub station 100 provides communication resources to a plurality of remote units 104A–104N. The link between the hub station 100 and the remote units 104 comprises a satellite 102. The inbound signals from the remote units 104 are transmitted to the satellite 102 where they are relayed to the hub station 100. Likewise, the signals from the hub station 100 are transmitted to the satellite 102 where they are relayed to the remote units 104A–104N. The hub station 100 may transmit information to the remote units which allows them to predict the occurrence of the admission boundaries such as by the use of a pilot signal and synchronization process or other well-known technique.

The remote units 104 may comprise a series of one or more processes which enable them to carry out the functions of the invention. Likewise, the hub station 100 may comprise a series of one or more processes which enable it to carry out the functions of the invention. The processes may be embodied, for example, within one or more integrated circuits, such as an application specific integrated circuit (ASIC), or may be embodied within software or firmware routines that are executed by a microcontroller.

A myriad of sets of predetermined unique sequences may be developed for use with the present invention. The set of predetermined sequences may depend upon the other operating criteria of the system. One convenient means of generating sequences is to choose a maximal length pseudo noise (PN) sequence and to generate a family of sequences based upon the sequence. For example, a set of n predetermined maximal length pseudo noise (PN) sequences can be generated from a maximal length PN sequence of length n by rotating the base sequence as follows:

| | |
|---|---|
| Sequence 1 | $c_1 \ c_2 \ c_3 \ c_4 \ldots c_n$ |
| Sequence 2 | $c_2 \ c_3 \ c_4 \ldots c_n \ c_1$ |
| Sequence 3 | $c_3 \ c_4 \ldots c_n \ c_1 \ c_2$ |
| ... | ... |
| Sequence n | $c_n \ c_1 \ c_2 \ c_3 \ c_4 \ldots$ |

In addition, the unique sequences may be Walsh codes generated using well-known techniques. Walsh codes have the advantage of being completely orthogonal if they are aligned in time. The use of signals which are completely orthogonal to one another further reduces inter-channel interference. Use of Walsh codes under the prior art is not practical because the Walsh codes produce high autocorrelation values for many non-zero chip offsets.

One potential problem with Walsh codes is that they do not typically provide good spreading properties. To overcome this limitation, new orthogonal sequence sets can be determined by masking each code in a family of Walsh codes with an arbitrary binary sequence. For example, Walsh codes may be masked with a maximal length sequence which provides the desired spectral properties to the resultant signal. In addition, either Walsh codes or the maximal length sequences may be overlaid with a long code which provides encryption (i.e. an added impediment to purposeful interception) to the transmissions.

In an embodiment where spectral resources allow the establishment of two or more parallel frequency channels, the remote unit may also choose between the available channels over which to transmit its signal. If a collision occurs, the remote unit may automatically change frequency channels or it may randomly reselect from the available frequency channels.

Figure 5:
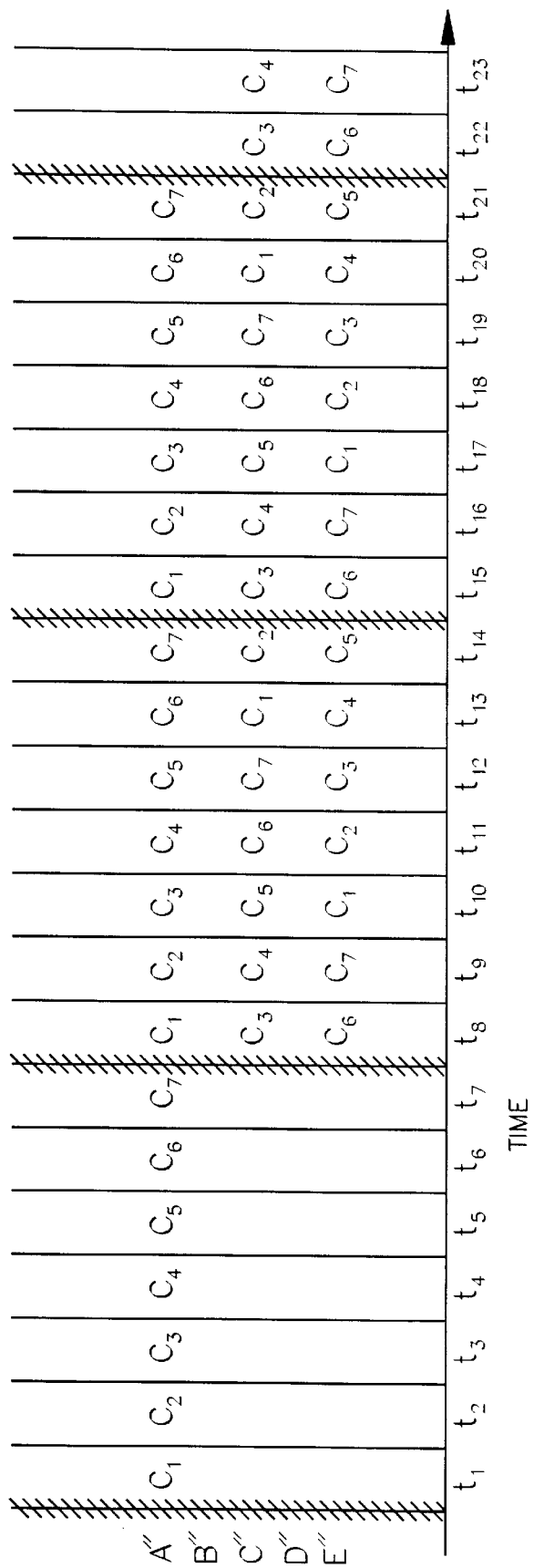
FIG. 5 is a timing diagram showing illustrative operation according to the invention.

FIG. 5 is a timing diagram showing illustrative operation of five remote units designated A", B", C", D" and E" according to the invention. In FIG. 5, seven distinct sequences have been generated based upon a seven chip maximal length PN spreading sequence. Each information bit transmitted by the remote unit is modulated by the entire seven bit sequence in this example. In FIG. 5, admission boundaries occur before the time segments $t_1$, $t_8$, $t_{15}$, and $t_{22}$ as indicated by the hash marks on the corresponding vertical time boundary indications in FIG. 5. So long as no other remote unit transmits using the same sequence at the same admission boundary, the hub station can distinguish among the remote unit signals using well-known spread spectrum acquisition and demodulation techniques. However, if two remote units transmit using the same sequence at the same admission boundary, a collision occurs and the information from each remote unit cannot be properly detected by the hub station 100.

One advantage of operation according to FIG. 5 in comparison to operation in accordance with the prior art is that the data bit transition boundaries are aligned for each remote unit. Therefore, in FIG. 5, the interference from the remote unit E" to the signal from the remote unit C" during the period of $t_8$ to $t_{14}$ is equal to 1/n for all data values. Likewise the interference from the remote unit A" to the signal transmitted by the remote unit C" is 1/n for all data values. Such operation greatly increases the signal quality with which signals can be demodulated by the hub station 100. For example, in a system in which a PN sequence of length 255 is used, a fully loaded system exhibits a signal to interference ratio of approximately 24 dB indicating a nearly 80 times improvement in inter-channel interference over the prior art.

The elimination of the partial sequence autocorrelation interference is achieved by placing the admission boundaries at the data bit boundaries. Admission boundaries may be placed at each bit boundary or at a subset of all of the bit boundaries. The slight delay associated with delaying transmission until the occurrence of an admission boundary does not significantly add delay if the admission boundaries follow one another in quick succession. The delay introduced to the system by awaiting for the admission boundaries is insignificant and is much less than that introduced by the random delay which much be inserted according to classic ALOHA operation.

As noted above, the average loading of a random access system cannot exceed a pre-defined percentage of the total capacity without risking a decrease in actual system throughput based upon the increasing incidence of collisions and re-transmissions. In a system utilizing the present invention, the random access channel loading should be limited in order to avoid such a phenomena. However, the increased performance gained through use of the present invention provides many advantages to the system.

As noted above, a DSSS system operates most efficiently when each remote unit signal reaches the hub station at approximately the same level. If the signals do not arrive at the hub station at the same level, the average signal to interference ratio of the system decreases and system performance is negatively affected. Due to the increased immunity to interference through the use of bit alignment, the power balancing accuracy requirements can be decreased. For example, in the prior art system described above, where n is equal to 255 and in which the resulting signal to interference ratio is 5.5 dB for a fully loaded system, in order to preserve the 5.5 dB signal to interference ratio, the power received from each remote unit at the hub station must be controlled within ¼ dB. In order to maintain such a precise power level, the hub station must send frequent power control commands to the remote unit, thus consuming significant system resources. Due to the increased performance, a system incorporating bit alignment and having n=255 which results in a signal-to-interference ratio of 24 dB for a fully loaded system, the power control set point requirement may be relaxed to within 1 dB without significantly affecting the resulting signal to interference ratio of a fully loaded system. This reduction in the need for accuracy in the power balancing process reduces the amount of the power control information which needs to be sent from the hub station to the remote unit by approximately three bits of resolution, thereby decreasing the resulting load on system resources. In addition to the random remote unit signaling, the random access channel may be overlaid with one or more non-contention connections. The non-contention connections can be scheduled or pre-assigned communications in which a system resource is uniquely allocated to a specific remote unit. In order to reduce interference, the non-contention channels are bit aligned with the random access channels. For example, the non-contention connections may be constrained to begin transmission only at an admission boundary. The spread spectrum properties which allow the hub station to discriminate between the random access channels also allow the hub station to discriminate between the random access channels and one or more non-contention channels. The spreading sequences used for the non-contention connections should be chosen to be nearly orthogonal to one another as well as the random access channels spreading sequences. Because of the increased immunity to interference which results from incorporation of bit alignment, additional non-contention connections can be overlaid within the same spectrum as the random access channels without appreciably degrading the bit error rate performance of the system. For example, 10%, 15%, 20% and even up to 25% or more of the channel may be allocated to non-contention connections in addition to the random channel usage without significantly decreasing the bit error rate performance of the random access channel due to the increased performance according to the invention.

Another advantage of the increased system performance is that higher order modulation techniques may be used to impress the data upon the non-contention or random access channels. Higher order modulation schemes, such as 16-ary quadrature amplitude modulation (QAM) or 64-ary QAM or 64-ary phase shift keying (PSK), increase by two or three or more times the capacity of the random access or non-contention channels. In one embodiment, the remote unit operates using a higher order modulation scheme comprising at least 16 different data values. Due to the increased performance, these higher order modulation schemes can be incorporated into the system without significantly impacting the bit error rate performance of the system. If the higher order modulation techniques are applied to the random access channel, the average time during which a remote unit uses one of the random access channels for a given data transmission is reduced, thus, freeing the random access channel for use by another sooner and decreasing the number of collisions.

In addition, the increased system performance eliminates that need for additional means to reduce interference. For example, U.S. Pat. No. 5,537,397 referred to above suggests the use of an interference storage device which stores possible interference sequences. The information in the interference storage device may be used to increase the degree of efficiency of the system. Such elements are not necessary in a system incorporating the present invention.

A random multiple access system may also incorporate a reservation scheme without significantly decreasing the bit error rate of the system. In one general embodiment, the remote unit randomly selects one of the random access channels each time that it has a message to send. In some cases, a remote unit may have an abnormally long message to send. In such a case, the hub station may reserve one sequence of the set of predetermined sequences for use solely by the remote unit for the duration of the message. The hub station may simply allow the remote unit to continue using a channel upon which it has begun transmission or it may assign the remote unit to another one of the channels. In this way, the remote unit is not interrupted during the transmission of the long message by other remote units attempting to access the system. In addition, the incidence of collisions for the remaining remote units is decreased if they refrain from transmitting over the reserved channel. The hub station may broadcast or specifically transmit a message to each remote unit specifying the channel to be reserved. In response, the other remote units temporarily refrain from using the reserved channel for random access communications. The reservation scheme may be incorporated into systems which include bit alignment as well as other DSSS multiple access systems.

Figure 6:
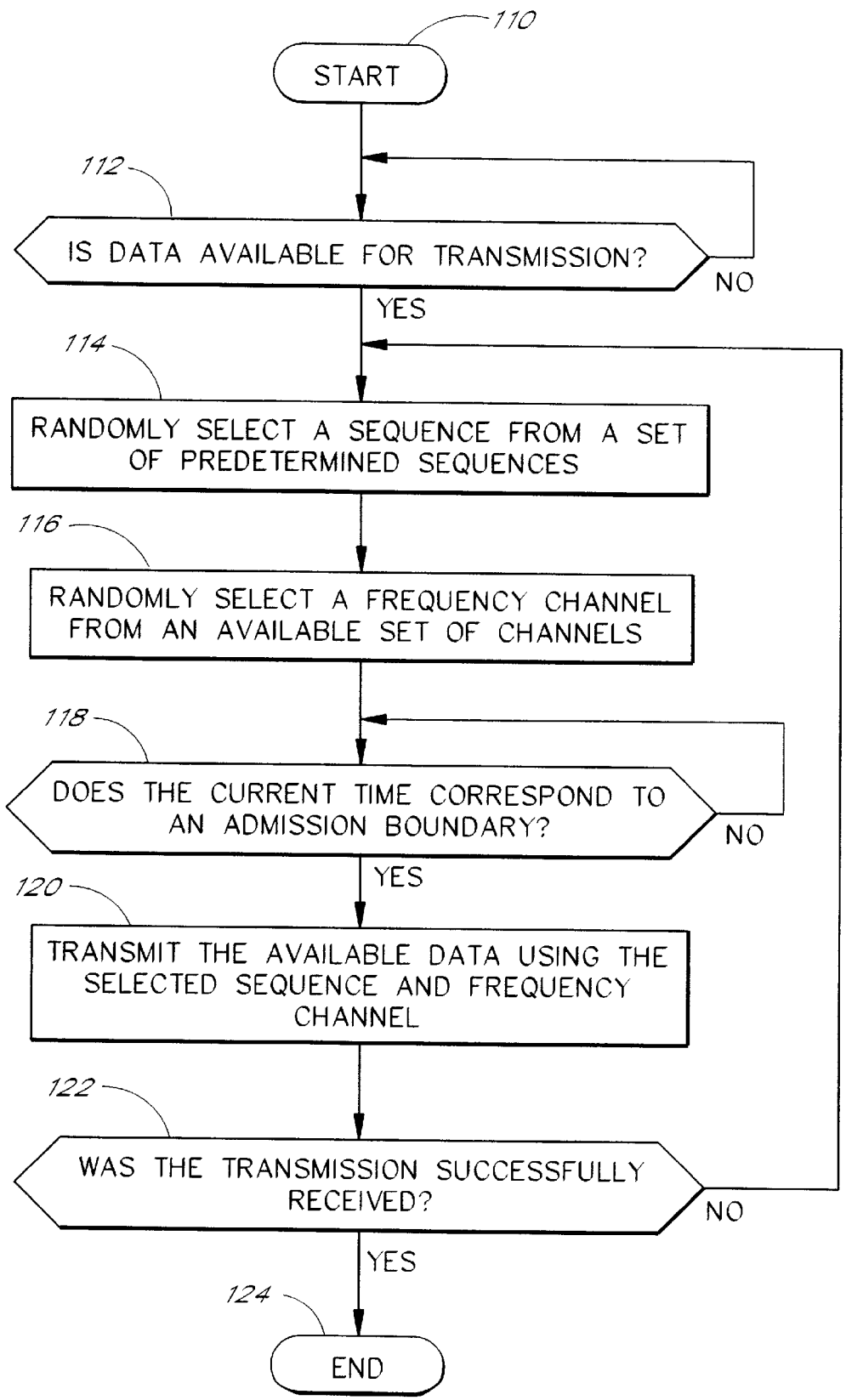
FIG. 6 is a flow chart showing exemplary operation of a remote unit.

FIG. 6 is a flow chart showing exemplary operation of a remote unit Flow begins in start block 110. Block 112 determines whether data is available for transmission. If not, the process awaits data. If data is available, flow continues to block 114. In block 114, a predetermined sequence is randomly chosen. In block 116, in this exemplary embodiment, the remote unit also randomly selects a frequency channel. In block 118, the remote unit pauses until an admission boundary is reached. In block 120, the remote unit begins to transmit the data beginning at an admission boundary. Block 122 determines whether the transmission was received by the hub station. The step may be implemented by monitoring the channel or by awaiting receipt of an acknowledgment from the hub station. Flow ends in block 124 after the successful transmission of the available data.

Figure 7:
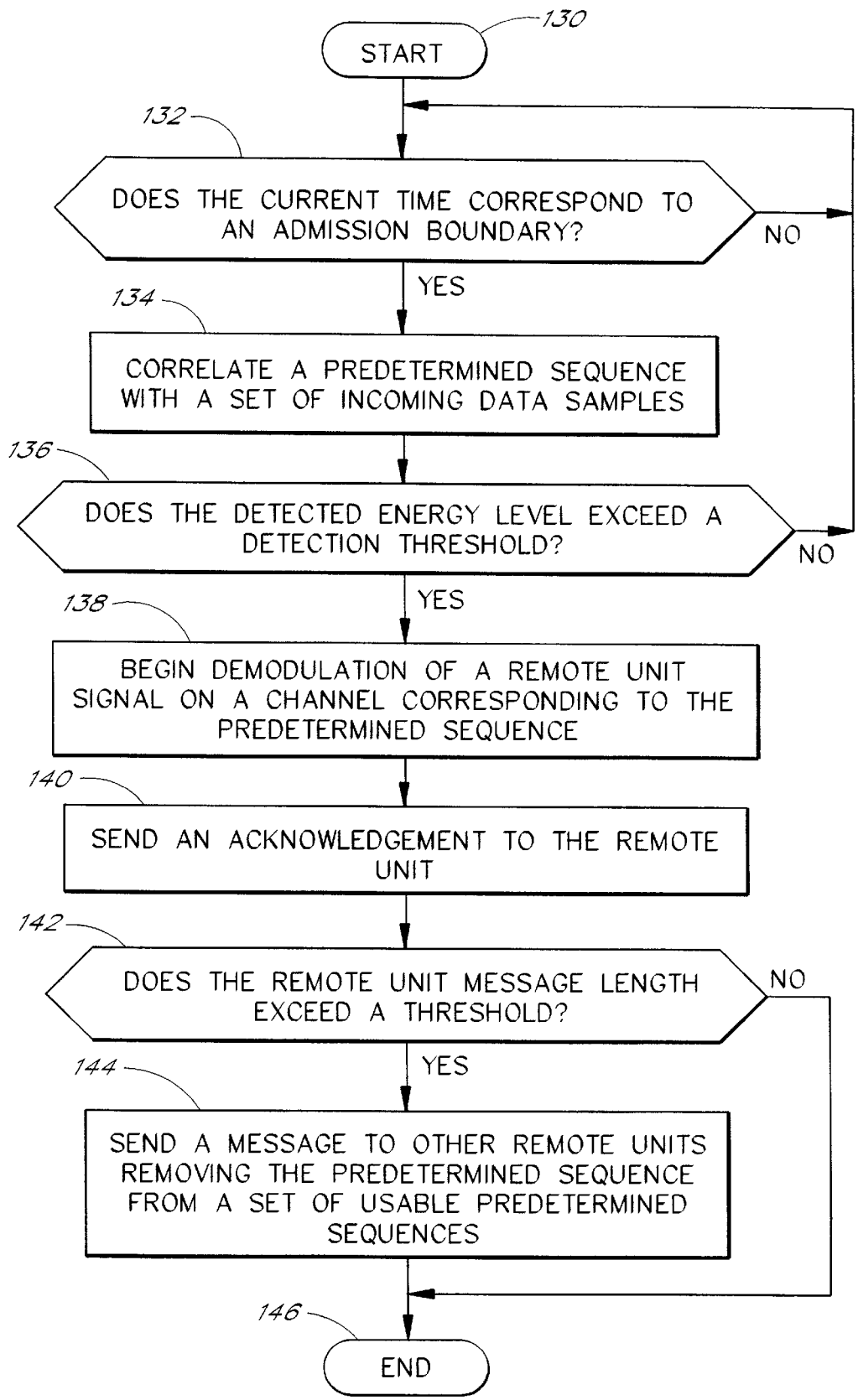
FIG. 7 is a flow chart showing exemplary operation of a hub station.

FIG. 7 is a flow chart showing exemplary operation of a hub station incorporating a reservation mechanism. Flow begins in start block 130. Block 132 determines whether the current time corresponds to an admission boundary. If so, the hub station begins to correlate a predetermined sequence with a set of incoming data samples. Block 136 determines whether the detected energy level exceeds a detection threshold. If not, flow continues back to block 132. If so, flow continues to block 138. In block 138, the hub station begins to demodulate the remote unit signal carried on the channel determined by the predetermined sequence. In block 140, the hub station sends an acknowledgment message to the remote unit. In block 142, the hub station determines whether the remote unit message length exceeds a threshold. If so, the hub station invokes the reservation scheme. In block 144, the hub station sends a message to other remote units removing the predetermined sequence from a set of usable predetermined sequences. In block 146, flow ends. Many alternative embodiments to the exemplary flow charts given in FIGS. 6 and 7 are readily apparent from examination of their exemplary operation including the simple rearrangement or parallel execution of the steps shown.

In another embodiment, the received signal can be demodulated by the hub station before detection. In such a case, detection can be executed based upon error correction or detection results or other signal quality indication.

Various means of selecting random and pseudo random numbers are well-known in the art. The mechanisms by which these random numbers may be converted to random decision is also well-known in the art. As used herein, the concept of "randomly selecting" comprises the concepts of purely random, pseudo-random, quasi-random selection as well as other techniques for selection such as the use of hash functions or time-of-day data, whether determinist, patternistic or statistical.

Many alternate embodiments within the scope of the present invention will be readily discernible to one skilled in the art. For example, although the insertion of arbitrary delay is not necessary to select a new channel upon which to retransmit, after a collision, in some cases, it may be advantageous to insert a delay in order to avoid system overload. Obviously the invention can be implemented in many types of systems in addition to satellite systems such as terrestrial cellular systems, terrestrial systems which incorporate repeaters, non-geosynchronous satellite systems and even wireline systems.

The invention may be embodied in other specific forms without departing from its spirit or essential characteristics. The described embodiment is to be considered in all respects only as illustrative and not as restrictive and the scope of the claim of the invention is, therefore, indicated by the appended claims rather than by the foregoing descriptions. All changes which come within the meaning and range of equivalency of the claims are to be embraced within their scope.

What is claimed is:

1. In a system in which multiple remote units compete for limited communication resources, a remote unit method of accessing the system comprising the steps of:

randomly selecting a first sequence from a set of predetermined sequences;

transmitting a data bit stream modulated with said first sequence beginning at one of a set of recurring admission boundaries;

determining whether said data bit stream has been successfully received at a hub station;

randomly selecting a second sequence from said set of predetermined sequences if said data stream has not been successfully received;

transmitting said data bit stream modulated with said second sequence beginning at one of said set of recurring admission boundaries; and receiving a command from said hub station to remove a reserved sequence from said set of predetermined sequences and refraining temporarily from transmitting using said reserved sequence for random access.

2. The method of claim 1 wherein said set of predetermined sequences comprises a maximal length sequence and a plurality of rotated versions of said maximal length sequence.

3. The method of claim 1 wherein said recurring admission boundaries coincide with boundaries between data bits within said data bit stream.

4. The method of claim 1 wherein said set of predetermined sequences are Walsh codes.

5. The method of claim 1 wherein said set of predetermined sequences are Walsh codes which have been masked with a second code.

6. The method of claim 1 wherein said data bit stream modulated with said first sequence is transmitted using a higher order modulation scheme.

7. The method of claim 1 further comprising the step of receiving a power control command from a hub station in order to set a power level used in said step of transmitting to within about 1 dB of accuracy.

8. The method of claim 1 wherein said recurring admission boundaries coincide with boundaries between data bits within said data bit stream.

9. In a system in which multiple remote units compete for limited communication resources, a remote unit method of accessing the system comprising the steps of:
randomly selecting a first sequence from a set of predetermined sequences;
transmitting a data bit stream modulated with said first sequence beginning at one of a set of recurring admission boundaries;
determining whether said data bit stream has been successfully received at a hub station, wherein said step of determining whether said data bit stream has been successfully received comprises the step of monitoring a communication channel which carries said data bit stream modulated with said first sequence to detect a collision with another remote unit signal;
randomly selecting a second sequence from said set of predetermined sequences if said data stream has not been successfully received; and
transmitting said data bit stream modulated with said second sequence beginning at one of said set of recurring admission boundaries.

10. In a system in which multiple remote units compete for limited communication resources, a remote unit method of accessing the system comprising the steps of:
randomly selecting a first sequence from a set of predetermined sequences;
transmitting a data bit stream modulated with said first sequence beginning at one of a set of recurring admission boundaries;
determining whether said data bit stream has been successfully received at a hub station, wherein said step of determining whether said data bit stream has been successfully received comprises the step of determining whether an acknowledgment of receipt of said data bit stream was received from said hub station;
randomly selecting a second sequence from said set of predetermined sequences if said data stream has not been successfully received; and
transmitting said data bit stream modulated with said second sequence beginning at one of said set of recurring admission boundaries.

11. In a system in which multiple remote units compete for limited communication resources, a remote unit method of accessing the system comprising the steps of:
randomly selecting a first sequence from a set of predetermined sequences;
transmitting a data bit stream modulated with said first sequence beginning at one of a set of recurring admission boundaries;
determining whether said data bit stream has been successfully received at a hub station; randomly selecting a second sequence from said set of predetermined sequences if said data stream has not been successfully received;
transmitting said data bit stream modulated with said second sequence beginning at one of said set of recurring admission boundaries; and
randomly selecting a frequency channel over which to transmit said data bit stream modulated with said second sequence.

12. In a system in which multiple remote units compete for limited communication resources, a remote unit method of accessing the system comprising the steps of:
randomly selecting a first sequence from a set of predetermined sequences;
transmitting a data bit stream modulated with said first sequence beginning at one of a set of recurring admission boundaries;
determining whether said data bit stream has been successfully received at a hub station; randomly selecting a second sequence from said set of predetermined sequences if said data stream has not been successfully received;
transmitting said data bit stream modulated with said second sequence beginning at one of said set of recurring admission boundaries; and
randomly delaying said step of transmitting said data bit stream modulated with said second sequence.

13. In a system in which multiple remote units compete for limited communication resources, a remote unit method of accessing the system comprising the steps of:
randomly selecting a first sequence from a set of predetermined sequences, wherein said set of predetermined sequences are Walsh codes which have been masked with a second code, and wherein said second code determines spectral properties of said set of predetermined sequences;
transmitting a data bit stream modulated with said first sequence beginning at one of a set of recurring admission boundaries;
determining whether said data bit stream has been successfully received at a hub station;
randomly selecting a second sequence from said set of predetermined sequences if said data stream has not been successfully received; and
transmitting said data bit stream modulated with said second sequence beginning at one of said set of recurring admission boundaries.

14. In a system in which multiple remote units compete for limited communication resources, a remote unit method of accessing the system comprising the steps of:
randomly selecting a first sequence from a set of predetermined sequences; and
transmitting a data bit stream modulated with said first sequence beginning at one of a set of recurring admission boundaries, wherein said data bit stream modulated with said first sequence is transmitted using a higher order modulation scheme, and wherein said higher order modulation scheme is a quadrature amplitude modulation comprising at least 16 values.

15. In a system in which multiple remote units compete for limited communication resources, a remote unit method of accessing the system comprising the steps of:
   randomly selecting a first sequence from a set of predetermined sequences; and
   transmitting a data bit stream modulated with said first sequence beginning at one of a set of recurring admission boundaries, wherein said data bit stream modulated with said first sequence is transmitted using a higher order modulation scheme, and wherein said step of transmitting comprises the step of transmitting a high frequency signal to a satellite for transmission to a hub station.

16. In a system in which multiple remote units compete for limited communication resources, a remote unit method of accessing the system comprising the steps of:
   randomly selecting a first sequence from a set of predetermined sequences;
   transmitting a data bit stream modulated with said first sequence beginning at one of a set of recurring admission boundaries;
   receiving a command from the hub station to use a reserved one of said set of predetermined sequences; and
   transmitting a data bit stream modulated with said reserved one of said set of predetermined sequences beginning at one of said set of recurring admission boundaries.

17. A method of receiving random access signals from a plurality of remote units, comprising the steps of:
   correlating one or more of a set of predetermined sequences with a set of incoming data samples beginning at one of a set of recurring admission boundaries;
   detecting a signal level above a detection threshold corresponding to a detected one of said set of predetermined sequences;
   demodulating a remote unit signal using said detected one of said set of predetermined sequences;
   detecting a remote unit message length which exceeds a threshold; and
   sending a message to other remote units temporarily removing said detected one from said set of predetermined sequences such that said other remote units refrain from using said detected one of said set of predetermined sequences for random access communications.

18. The method of claim 17, further comprising the step of transmitting an indication of said set of recurring admission boundaries to a set of remote units.

19. The method of claim 17 wherein said set of predetermined sequences comprises a maximal length sequence and a plurality of rotated versions of said maximal length sequence.

20. The method of claim 17 wherein said set of recurring admission boundaries coincide with boundaries between data bits within said remote unit signal.

21. The method of claim 17 wherein said set of predetermined sequences are Walsh codes.

22. The method of claim 17 wherein said set of predetermined sequences are Walsh codes which have been masked with a second code.

23. The method of claim 17 further comprising the step of sending a power control command to said remote unit in order to set a power level at which said remote unit is transmitting to within about 1 dB of accuracy.

24. A method of receiving random access signals from a plurality of remote units, comprising the steps of:
   correlating one or more of a set of predetermined sequences with a set of incoming data samples beginning at one of a set of recurring admission boundaries;
   detecting a signal level above a detection threshold corresponding to a detected one of said set of predetermined sequences;
   demodulating a remote unit signal using said detected one of said set of predetermined sequences; and
   demodulating a series of non-contention channels which share a common frequency spectrum with said set of incoming signal samples wherein said series of non-contention channels are bit aligned with said set of recurring admission boundaries.

25. The method of claim 24, wherein said series of non-contention channels consume 10% to 25% of the capacity of said common frequency spectrum.

26. A method of receiving random access signals from a plurality of remote units, comprising the steps of:
   correlating one or more of a set of predetermined sequences with a set of incoming data samples beginning at one of a set of recurring admission boundaries, wherein said set of predetermined sequences are Walsh codes which have been masked with a second code, and wherein said second code determines spectral properties of said set of predetermined sequences;
   detecting a signal level above a detection threshold corresponding to a detected one of said set of predetermined sequences;
   demodulating a remote unit signal using said detected one of said set of predetermined sequences.

27. A method of receiving random access signals from a plurality of remote units, comprising the steps of:
   correlating one or more of a set of predetermined sequences with a set of incoming data samples beginning at one of a set of recurring admission boundaries;
   detecting a signal level above a detection threshold corresponding to a detected one of said set of predetermined sequences;
   demodulating a remote unit signal using said detected one of said set of predetermined sequences, wherein said step of demodulating comprises the step of demodulating said remote unit signal using a higher order modulation scheme, and wherein said higher order modulation scheme is a quadrature amplitude modulation comprising at least 16 values.

28. A remote unit which is adapted to operate in a system that includes a hub station and a plurality of remote units, comprising:
   a process which randomly selects a first sequence from a set of predetermined sequences;
   a process which transmits a data bit stream modulated with said first sequence beginning at one of a set of recurring admission boundaries;
   a process which determines whether said data bit stream has been successfully received at a hub station;
   a process which randomly selects a second sequence from said set of predetermined sequences whether said data stream has been successfully received; and
   a process which transmits said data bit stream modulated with said second sequence beginning at one of said set of recurring admission boundaries of said data stream has not been successfully received; and a process which randomly selects a frequency channel over which to transmit said data bit stream modulated with said first and second sequence.

29. The system of claim 28 wherein said set of predetermined sequences comprises a maximal length sequence and a plurality of rotated versions of said maximal length sequence.

30. The system of claim 28 wherein said set of recurring admission boundaries coincide with boundaries between data bits within said data bit stream.

31. The system of claim 28 further comprising:

a process which receives a command from the hub station to use a reserved one of said set of predetermined sequences; and a process which transmits a data bit stream modulated with said reserved one of said set of predetermined codes beginning at one of said set of recurring admission boundaries.

32. A remote unit which is adapted to operate in a system that includes a hub station and a plurality of remote units, comprising:

a process which randomly selects a first sequence from a set of predetermined sequences;

a process which transmits a data bit stream modulated with said first sequence beginning at one of a set of recurring admission boundaries;

a process which determines whether said data bit stream has been successfully received at a hub station;

a process which randomly selects a second sequence from said set of predetermined sequences whether said data stream has been successfully received; and a process which transmits said data bit stream modulated with said second sequence beginning at one of said set of recurring admission boundaries of said data stream has not been successfully received; and a process which randomly delays transmitting said data bit stream modulated with said second sequence.

* * * * *